United States Patent [19]

Schneider et al.

[11] Patent Number: 5,645,636

[45] Date of Patent: Jul. 8, 1997

[54] PASTY PIGMENT PREPARATIONS, PREPARATION THEREOF AND USE THEREOF

[75] Inventors: Manfred Schneider, Eppstein/Taunus; Rainer Schunck, Bad Soden am Taunus; Dieter Schnaitmann, Eppstein/Taunus; Udo Brost, Offenbach, all of Germany

[73] Assignee: Hoechst Aktiengesellschaft, Frankfurt, Germany

[21] Appl. No.: 333,886

[22] Filed: Nov. 3, 1994

Related U.S. Application Data

[63] Continuation of Ser. No. 697,103, May 8, 1991, abandoned.

[30] Foreign Application Priority Data

May 10, 1990 [DE] Germany .......................... 40 14 953.6

[51] Int. Cl.$^6$ ............................................. C08K 5/16
[52] U.S. Cl. ...................... 106/493; 106/408; 106/31.75; 524/159
[58] Field of Search ................................ 106/408, 23 R, 106/493

[56] References Cited

U.S. PATENT DOCUMENTS

| | | | |
|---|---|---|---|
| 3,950,288 | 4/1976 | Herbst et al. ........................... | 8/524 |
| 3,996,059 | 12/1976 | Stansfield et al. ...................... | 106/413 |
| 4,013,687 | 3/1977 | Paget et al. ............................. | 552/259 |
| 4,189,328 | 2/1980 | Flores ...................................... | 106/408 |
| 4,309,320 | 1/1982 | Arora et al. ............................. | 106/408 |
| 5,030,283 | 7/1991 | Bender et al. .......................... | 106/228 |
| 5,082,498 | 1/1992 | Kurtz et al. ............................. | 106/408 |

FOREIGN PATENT DOCUMENTS

| | | |
|---|---|---|
| 2354225 | 12/1976 | Germany . |
| 2264176 | 12/1981 | Germany . |
| 2206611 | 6/1982 | Germany . |

OTHER PUBLICATIONS

Winnacker, K. et al, *Chemische Technologie*, Munchen, Germany, Carl Hanser Verlag, 1972, pp. 362,375,376 & 408 (no month available).

*Primary Examiner*—Mark L. Bell
*Assistant Examiner*—Scott L. Hertzog
*Attorney, Agent, or Firm*—Connolly & Hutz

[57] ABSTRACT

The deliveries to the printing ink industry of pigment preparations in the form of flushed pastes increasingly take the form of containers. Given the required high pigment content of the pastes and the attendant high viscosity and thixotropy, there are very frequent problems with filling the containers and complaints concerning the emptying of the containers. There is a demand for a homogeneous, pumpable pigment paste having a long shelf life. According to the invention, this demand is met in the case of pigments based on arylpararosanillnesulfonic acids by the use of specific aids of the type of the condensation products of aliphatic amines or ammonium compounds with polyesters of hydroxy fatty acids as part of the flushing process of the pigment using the customary or slightly modified binder systems which for the same pigment contents bring about a distinctly lower viscosity and thixotropy. The printing properties are not adversely affected.

18 Claims, No Drawings

PASTY PIGMENT PREPARATIONS, PREPARATION THEREOF AND USE THEREOF

This application is a continuation of application Ser. No. 07/697,103 filed on May 8, 1991 abandoned.

DESCRIPTION

The present invention relates to novel, useful pigment preparations based on arylpararosanilinesulfonic acids which are suitable in particular for preparing printing inks, especially for letterpress and offset printing.

It is common knowledge to subject aqueous presscakes of pigments of the arylpararosanilinesulfonic acid series of the formula I

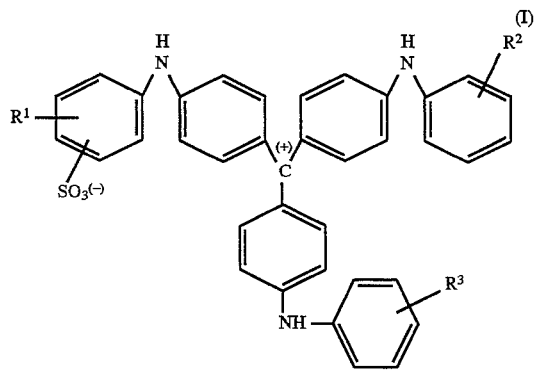

where $R^1$, $R^2$ and $R^3$ are each independently of the others hydrogen, halogen, such as chlorine or bromine, $C_1$–$C_3$-alkyl, $C_1$–$C_3$-alkoxy or nitro, to flushing—a process whereby the pigment is transferred (flushed) to a binder phase and at the same time substantially dewatered and concentrated [see for example K. Winnacker and L. K üchler, "Chemische Technologie", 3rd edition, volume 4, pages 362, 375, 376 and 408 (1972)]. This produces flushed concentrates which contain the pigment in a thoroughly dispersed form and which are readily incorporable into a letterpress or offset printing varnish to produce a strong letterpress or offset printing ink.

The use of flushed concentrates for preparing printing inks instead of the usual pigment powders is of particular advantage in the case of arylpararosaniline-sulfonic acid pigments. This is because if the water-moist pigment presscakes are dried, as is customary for many other pigments, the arylpararosanilinesulfonic acid pigments in question form on account of their pronounced polarity, hard agglomerates which are impossible to reduce in size by normal mechanical grinding on a three-roll mill. The poor dispersibility of such pigments has an unfavorable effect on the color strength, homogeneity, gloss and transparency of the printing inks prepared therewith. Dried, unfinished arylpararosaniline-sulfonic acid pigments are therefore unsuitable for direct use in printing inks. The flushed pastes of these pigments, by contrast, do not have this disadvantage, given the right choice of binder.

The binders hitherto predominantly used for flushing arylpararosanilinesulfonic acid pigments consist of a resin mixture and a high-boiling mineral oil. Such binders are described in DE Patent 2,354,225 (U.S. Pat. No. 3,950,288). The binders described therein are resin mixtures in mineral oils in which the mineral oil content is in general between 35 and 60% by weight. The resin mixtures themselves have been optimized in their composition to such an extent that the pigment is thoroughly wetted during the kneading process involved in flushing.

The flushed arylpararosanilinesulfonic acid pigment pastes prepared with the binders mentioned customarily have a pigment content of 35–45% by weight and hence a viscosity within the range of 40–200 pascalseconds (Pa·s), measured with a falling rod viscometer. Flushed paste viscosities of this order of magnitude and in particular the thixotropic tendencies of flushed pastes mean that the handling of these products is not simple, which is why the disposal of incompletely emptied or soiled containers is increasingly becoming a problem.

Since the resin mixtures contained in the flushing varnishes remain in the printing inks produced later with the aid of the flushed pastes, the resins contemplated for this purpose must substantially conform to or at least be compatible with the varnishes used as binders for formulating these printing inks in respect of their physical properties such as drying behavior, gloss, rheology and so on. This occasionally necessitates a certain degree of compromise in the selection of the resins, which is why in those cases the optimal degree of pigment wetting required is obtained during the flushing process only after an uneconomically long kneading time. Moreover, the lack of kneading consistency very frequently gives rise to unsatisfactory dispersion of the pigment, which then leads to lower color strength and hence to difficulties in printing with the offset inks prepared therewith.

Thus, it is not possible to meet all requirements with a single flushed paste, in particular since the composition and rheological properties thereof can hardly be varied because of the peculiarity of the flushing process and the high color strength dictated by the market. As the conditions during the printing process vary with the field in question, there is a need for a multiplicity of printing inks having widely differing rheological properties. The properties of the ready-prepared printing inks are strongly influenced by the particular flushed paste used.

There is therefore a need for a flushing aid for arylpara-rosanilinesulfonic acid pigments which has a constitution such that it speeds up the process of flushing through more thorough pigment wetting and hence more complete water repellency, makes possible better dispersing through a higher pigment content of the flushed concentrate and, what is more, despite the higher pigment content of the dried flushed product permits a very wide choice of viscosity profile for the ready-prepared flushed pastes. Moreover, these pastes should possess a long shelf life and even in the case of a low viscosity should have no adverse effect on the rheological properties of black and blue inks prepared therewith or on the offset printability thereof.

It has now been found, surprisingly, that according to the invention the addition of small amounts of a specific aid prior to the flushing makes it possible to meet these requirements and produces flushed pastes which are free-flowing and devoid of any thixotropic tendencies.

The present invention accordingly provides pasty pigment preparations containing essentially a) 5 to 50% by weight of at least one pigment of the abovementioned formula I;

b) at least one long-oil alkyd resin which is based on a polyester and has an oil content of from 70 to 80% by weight, said oil content being due to the modification of the polyester with a drying, semidrying or nondrying oil, a mixture of a plurality of these oils or with corresponding fatty acids or a combination thereof, the dicarboxylic acid component of the polyester being based on a mixture of isophthalic and orthophthalic acid and a small proportion of at least one α,β-unsaturated dicarboxylic acid or anhydride of the underlying dicarboxylic acid and the polyhydricalcohol component of the polyester representing a mixture of glycerol and pentaerythritol;

c) at least one hydrocarbon resin having an average molecular weight in the range from 600 to 1700, or at least one natural resin ester based on modified or unmodified natural resin acids and monohydric or polyhydric alcohols of from 1 to 20 carbon atoms, the weight ratio of component b) to component c) varying within the range from 1:3 to 3:1;

d) at least one flushing aid based on a condensation product of a primary, secondary or tertiary aliphatic amine or a corresponding quaternary ammonium compound with a polyester derived from a monobasic, medium or higher aliphatic hydroxycarboxylic acid, in the presence or absence of a dye adduct based on a similar polyester; and e) a high-boiling mineral oil.

Of particular interest are pigment preparations of the present invention comprising a) from 20 to 48% by weight, preferably from 30 to 45% by weight, of a pigment of the formula I;

b) and c) from 20 to 50% by weight, preferably from 30 to 45% by weight, of a mixture of the resins defined above as constituents of these components;

d) from 0.3 to 10% by weight, preferably from 1 to 4% by weight, of a flushing aid of the abovementioned type; and e) from 20 to 50% by weight, preferably from 20 to 35% by weight, of a high-boiling mineral oil.

In a particular variant of the present invention, the composition of the pigment preparations may also include, instead of mixtures of the synthetic resins of components b) and c) and the mineral oil of component e), f) at least one oxidatively drying varnish based on unsaturated compounds, primarily derived from vegetable or animal oils.

In such a case, the pigment preparation will contain from 40 to 80% by weight, preferably from 40 to 60% by weight, of component f) as a replacement component.

Preferred pigment preparations contain pigments of the abovementioned formula I where $R^1$, $R^2$ and $R^3$ are each independently of the others hydrogen, methyl, ethyl, n-propyl or isopropyl, in particular hydrogen or methyl. Examples of pigments of the formula I are the compounds indexed in the COLOUR INDEX, 3rd edition (1971), volume 4, as C.I. Pigment Blue 18 (No. 42770:1), C.I. Pigment Blue 56 (No. 42800), C.I. Pigment Blue 57 (No. 42795) and C.I. Pigment Blue 61 (No. 42765:1).

In general, the pigment preparations of the present invention contain as binder a long-oil mixed alkyd resin (component b) having an oil content of from 70 to 80% by weight, preferably from 75 to 77% by weight, combined with from 1 to 1.5 times, preferably from 1 to 1.25 times, the amount of one or more hydrocarbon resins having an average molecular weight within the range 600–1700, or of a natural resin ester based on modified or unmodified natural resins as acid constituent (component c).

The long-oil mixed alkyd resins of component b) required for this purpose can be prepared in a conventional manner as oil- or fatty acid-modified polyesters by reacting in the main isophthalic and orthophthalic acid and small amounts of one or more α,β-unsaturated dicarboxylic acids with a mixture of glycerol and pentaerythritol together with the above-defined oils or fatty acids or combinations thereof in one or more stages.

Suitable oils for synthesizing the long-oil alkyd resins are for example linseed oil, castor oil, coconut oil, ricinenic oil, sunflower oil, cottonseed oil, soybean oil, groundnut oil, tall oil and tallow oil, preferably linseed oil or castor oil, and also combinations of at least two of said oils.

If fatty acids are involved in forming the long-oil alkyd resins, suitable for this purpose are for example fatty acids and fatty acid mixtures which are obtainable by saponifying the aforementioned oils. It is also possible to use straight-chain or branched, saturated fatty acids of from 7 to 10 carbon atoms, fatty acids from the saponification of fats such as in particular beef tallow fat, and also resin acids, benzoic acid, p-tert-butylbenzoic acid and combinations of said acids.

The oil content mentioned in connection with alkyd resins prepared using not only the oils mentioned but also the fatty acids mentioned is defined as the weight proportion—based on the alkyd resin—of modifying oils or fatty acids—expressed as triglycerides—which in the course of the preparation of the alkyd resin have contributed to the modification thereof.

The hydrocarbon resin of component c) of the pigment preparations of the present invention can consist of a single hydrocarbon resin or a mixture of hydrocarbon resins, as long as the average molecular weight of such a resin is always within the range from 600 to 1700. Preferably, the hydrocarbon resin of component c) is a mixture of two hydrocarbon resins, of which one has an average molecular weight between 600 and 1100 and the other an average molecular weight between 1400 and 1700.

Suitable combinations of resins of components b) and c) of the pigment preparations of the present invention are already known from DE Patent 2,354,225 (U.S. Pat. No. 3,950,288). Their solutions in mineral oil are suitable for flushing aqueous presscakes of pigments of the formula I.

Other compounds suitable for use as component c) for the purposes of the present invention are natural resin esters of natural resin acids, for example esters of abietic acid, dehydroabietic acid, dihydroabietic acid, tetrahydroabietic acid, levopimaric acid, dextropimaric acid, isodextropimaric acid, neoabietic acid, palustric acid, pimaric acid and isopimaric acid, as occur in commercial rosins. Preference is given to esters of rosin, such as esters of balsam rosin, root resin and tall resin, and also to esters of disproportionated or hydrogenated rosin. But it is also possible to use other rosin derivatives, such as esters of polymerized and dimerized rosin and of rosin adducts with unsaturated monocarboxylic or dicarboxylic acids, for example maleic anhydride adducts.

Suitable alcohols for esterifying the aforementioned natural resin acids are mono-, di- or polyalcohols of from 1 to 20 carbon atoms and mixtures thereof, for example lower aliphatic alcohols such as methanol, ethanol, propanol, butanol, isobutanol, pentanol, hexanol and heptanol, fatty alcohols of from 8 to 20 carbon atoms, dialcohols such as ethylene glycol, propylene glycol, butylene glycol, diethylene glycol, triethylene glycol ether and neopentylglycol ether, and polyalcohols such as glycerol, trimethylolpropane, pentaerythritol, dipentaerythritol, pentitols and hexitols.

Preferred pigment preparations contain natural resin esters based on 2- to 6-hydric alcohols of up to 10 carbon atoms, in particular alcohols selected from the group consisting of glycerol, trimethylolpropane and pentaerythritol.

The condensation products of component d) used as flushing additives with dispersing properties are described in DE Patent 2,264,176 (U.S. Pat. No. 3,996,059) and conform to the formula II $$Y\text{—}CO\text{—}Z\text{—}Q \qquad (II)$$

where Y is the radical of a polyester chain which together with the adjoining —CO— group is derived from a hydroxycarboxylic acid of the formula III $$HO\text{—}X\text{—}COOH \qquad (III)$$

where X is the divalent radical of a saturated or unsaturated, aliphatic chain hydrocarbon having at least 8 carbon atoms, preferably from 12 to 20 carbon atoms, in which there are at least 4 carbon atoms, preferably from 8 to 14 carbon atoms, between the hydroxyl and the carboxylic acid group, the hydroxyl group of the carboxylic acid preferably being a secondary hydroxyl group, or from a mixture of such a hydroxycarboxylic acid of the formula III and a hydroxyl-devoid aliphatic carboxylic acid.

Z is a divalent aliphatic bridge member which is bonded to the —CO— group via an oxygen or nitrogen atom, in particular a bridge-forming structural element of the formula IV $$\text{—NH—A— or —NT}^1\text{—A— or —O—A—} \qquad (IV)$$

where $T^1$ is an alkyl radical (of up to 20 carbon atoms) and A is an alkylene or hydroxyalkylene radical of 2 to 6 carbon atoms, and Q is either a primary, secondary or tertiary amino group, in particular an amino group of the type

where $T^2$ and $T^3$ are each independently of the other a hydrogen atom or an alkyl or cycloalkyl radical (of up to 20 carbon atoms), or a salt of the amino group in question with an inorganic or organic (colorless or colored) acid, or is a quaternary ammonium salt grouping, in particular an ammonium salt grouping of the type

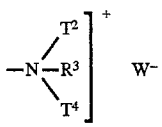

where $T^4$ has the same value as $T^2$ and can be identical to $T^2$ or different from $T^2$, and $W^-$ is the anion of an inorganic or organic (colorless or colored) acid.

The dyestuff adducts with one or more polyester radicals which may be used as flushing aids in the context of component d) are compounds known from DE Patent 2,206,611 (U.S. Pat. No. 4,013,687) of the formula V $$(Y\text{—}CO\text{—}O\text{—}Z')_n D \qquad (V)$$

where D is the radical of an organic dye which is preferably free of water-solubilizing groups such as —SO$_3$H or —COOH and which is bonded to each Z' via a carbon atom of an aromatic ring present in D, for example a benzene ring, the dyestuff radical being in particular a copper phthalocyanine radical, Y is as defined above in connection with the formula II, n is a positive integer from 1 to 8 inclusive, preferably from 1 to 4 or 5, and Z' is a divalent aliphatic bridge member, in particular a bridge-forming structural element of the formula VI $$\text{—A'—(B)}_m\text{—} \qquad (VI)$$

where A' is an alkylene or hydroxyalkylene radical (of up to 20 carbon atoms), in particular —CH$_2$—, and B is a group of the formula —NH—, —SO$_2$—NH— or —CO—NH/NH—CO—, and m is 0 or 1.

Expressed more precisely in relation to the polyesters Y—COOH involved, the composition of the above compounds of the formulae II and V conforms to the following structures:

IIa) H—(O—X—CO)$_y$—Z—Q

IIb) T—CO—(O—X—CO)$_y$—Z—Q

Va) [H—(O—X—CO)$_y$—O—Z']$_n$D

Vb) [T—CO—(O—X—CO)$_{y-1}$—O—Z']$_n$D in which the symbols D, Q, X, Z, Z' and n are as defined above, T is a monovalent, saturated or unsaturated aliphatic hydrocarbon radical of at least 8 carbon atoms, preferably of 12 to 20 carbon atoms, and y is a positive number from 2 to 20, preferably from 2 to 10, and here indicates the number of monomeric units of the formula III which are involved in the formation of the polyester chain.

The formulae IIb) and Vb) take account of the fact that at the time of the polymerization of the hydroxycarboxylic acids of the formula III hydroxyl-devoid carboxylic acids T—COOH may also be present in certain circumstances.

Moreover, in the case of the dyestuff adduct compounds of the formula V it is possible that, provided the index n is >1, polyester radicals Y of identical or different chain lengths may be present in one and the same molecule as substituents on D.

If such polyester/dyestuff adducts of the formula V are contemplated in the context of the flushing aid as additional constituent of component d), they would merely be present in minor amounts, compared with the polyester/amino condensation product of the formula II. More particularly, the weight ratio of compounds of type II to compounds of type V will vary within the range from 4:1 to 10:1.

Specific examples of suitable hydroxycarboxylic acids for use as monomeric starting materials for the type Y—COOH polyesters mentioned are ricinoleic acid, a mixture of 9- and 10-hydroxystearic acid (prepared by sulfation of oleic acid and subsequent hydrolysis) and 12-hydroxystearic acid and especially the commercial hydrogenated castor oil fatty acid which in addition to 12-hydroxystearic acid contains minor amounts of stearic acid and palmitic acid.

The carboxylic acids T—COOH which may be used together with the hydroxycarboxylic acids for preparing the polyesters are saturated or unsaturated aliphatic carboxylic acids, in particular alkyl- or alkenyl-carboxylic acids having a chain of from 8 to 20 carbon atoms. Examples of such acids are lauric acid, palmitic acid, stearic acid and oleic acid.

Component e) of the pigment preparations of the present invention is a high-boiling mineral oil. This mineral oil can be an aromatics-containing or aromatics-free mineral oil and generally has a boiling range between 200° and 530° C. Preference is given to using a low-aromatics mineral oil with a boiling range between 240° and 325° C.

If instead of the resin mixtures of components b) and c) oxidatively drying varnishes are contemplated for use as component f of the pigment preparations of the present invention, this function may be performed for example by tall oil, linseed oil, soybean oil, castor oil, olive oil, rapeseed oil, cottonseed oil, groundnut oil, fish oil and others.

In addition to components a) to f) the pigment preparations of the present invention may contain customary aids as further components. Such aids are for example preservatives such as fungicides.

The present invention further provides a process for preparing the above-defined pigment preparation which contains essentially the abovementioned components a) to f) by flushing aqueous presscakes of one or more pigments of the aforementioned formula I, which comprises prior to the start of the actual flushing treatment first of all thoroughly mixing the water-moist pigment presscake with the aid or aids of component d) and only then initiating the actual flushing process either by adding the solution of a resin mixture of components b) and c) in a mineral oil corresponding to component e) or by adding an oxidatively drying varnish corresponding to component f) and carrying out the usual measures for transferring the pigment into the added binder combination, the water which is liberated from the presscake in the course of flushing being removed from the multiphase system and the residual water then still remaining in the pigment paste thus obtained being evaporated off by drying under reduced pressure.

According to the present invention, this is accomplished in general by adding the flushing aid described as component d) to the water-moist pigment presscake and thoroughly kneading for example with the aid of double trough kneaders of conventional design. This kneading must be carried out carefully and for a sufficiently long period, since it has a crucial bearing on the course and the outcome of the subsequent flushing process. This batch is then admixed by continued kneading with the flushing varnish, advantageously added a little at a time, which consists of a solution of the component b) and c) resins in a component e) mineral oil or contains in the main component f) oxidatively drying oils, and after the desired pigment/binder ratio of from 0.5 to about 0.9 has been reached the transfer of the pigment to the organic phase takes place very rapidly and the removal of the water takes place virtually spontaneously. After the water which is drawn from the moist presscake in this way—by interchange of the two liquid phases—has been separated off, for example by decanting, the process can be repeated a number of times by adding further pigment presscakes and flushing with varnish. To conclude said steps for transforming the pigment into a readily usable form, the flushed batch is customarily dried under reduced pressure with or without heating. Here it may in certain circumstances be advantageous to add to the flushed paste, before or during the removal of the remaining water by treatment under reduced pressure, further mineral oil of component e) either alone or together with a solution of the resin mixture of components b) and c) in mineral oil of component e). If an oxidatively drying varnish is employed as component f), basically the same procedure can be adopted.

With all these variants it is important to carry out preliminary experiments to determine which pigment to binder ratios are appropriate in a particular case, since, as the degree of water removal increases, the viscosity of the paste containing the flushing aid of the present invention increases and as a result the desired trouble-free dispersing behavior coupled with a low kneading consistency would no longer be ensured. The pigment preparations of the present invention can be prepared with pigment contents of up to 50% by weight, which results in a high viscosity coupled with good kneading characteristics and hence shorter drying times coupled with excellent fine division.

The present invention finally also provides for the use of the above-explained pigment preparations for preparing printing inks. The claimed flushed pastes of arylpararosanilinesulfonic acid pigments are noteworthy for excellent properties which make them suitable in particular for use as colorants for the pigmenting of letterpress and offset printing inks.

For instance, the pigment preparations in question generally have a tack within the range from 4 to 25, preferably between 9 and 22, incometer units and on dilution with a customary printing varnish produce printing inks having a tack as required for letterpress and offset printing inks. The measure of tack employed here is the torque which is transferred from a roll provided with the preparation to an undriven contact roll on account of the tack of the preparation (1 incometer unit=60 cm×pond). The incometer value is an instrument-dependent value and relates in this instance to the "Inkomat" tackometer from Prüfbau (Munich).

The pigment preparations of the present invention have a long shelf life. Even on prolonged storage at 50° to 60° C. the pigment preparations remain viscosity-stable within the practically relevant range from 5 to 100 Pa·s, homogeneous and readily processible.

The claimed flushed pastes can be prepared with pigment contents of up to 50% by weight. Preference is given to pigment contents of from 20 to 48% by weight. By using varying amounts of the aids corresponding to component d) it is possible to control the viscosity of the flushed pastes within wide limits even at high pigment contents, which facilitates handling and very appreciably broadens the application spectrum of the preparation.

Despite the sometimes low viscosities of the flushed pastes, the printing inks prepared therefrom are highly suitable for the intended purpose in respect of rheological properties, tack and water regain.

The pigment preparations obtainable by the invention are noteworthy for very wide compatibility with the binder and printing ink systems customary for the various printing processes, such as letterpress and planographic printing, and in single-color or multicolor printing technology. For instance, they are easy to incorporate into binder systems for letterpress inks, offset inks, heat-set offset inks or news type web inks. The printing inks pigmented with the claimed preparations give a trouble-free printing performance and produce strong glossy prints. Pigment preparations produced according to the present invention can also be mixed with black pastes to produce printing inks which on printing give a good gloss and brightening effect. Furthermore, these pigment preparations are also suitable for preparing inks for copy papers and inked ribbons.

In the Examples which follow, parts and percentages are by weight, unless otherwise stated. The structures of the pigments used are in some Examples shown in an "idealized formula". In these particular cases, the pigment in question is a mixture of triarylpararosanilinemonosulfonic acids which are formed together in the course of the sulfonation of the corresponding triarylpararosaniline and which differ from one another by having the sulfo group attached to a different one of the structurally different terminal aryl moieties.

EXAMPLE 1

240 parts of a pigment based on a mixture of triphenylpararosanilinemonosulfonic acids conforming to the idealized formula VII

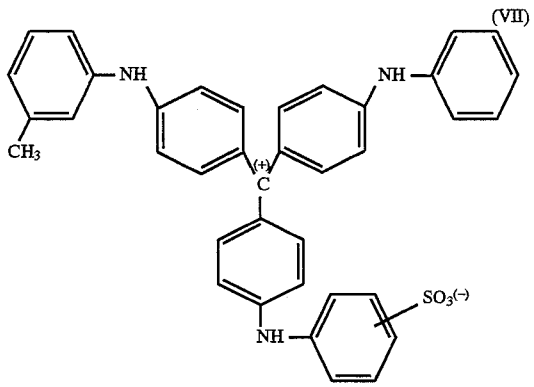

in the form of an aqueous presscake (968 parts) having a pigment content of 24.8% are admixed in a kneader with sigmoidal paddles with 8.4 parts of a flushing aid obtained by the method of Example 1 of DE Patent 2,264,176 (U.S. Pat. No. 3,996,059) by reaction of a polyester A prepared from a commercial 12-hydroxystearic acid (degree of condensation y=6) with 3-dimethylaminopropylamine and intimately mixed therewith by kneading for 10 minutes.

Thereafter, while the kneading of the contents continues, 160 parts of a flushing varnish corresponding to binder A of DE Patent 2,354,225 (U.S. Pat. No. 3,950,288), comprising the there-specified combination of mixed alkyd resin, hydrocarbon resin and mineral oil in a weight ratio of about 1:1:1, are added a little at a time to transfer the pigment from the aqueous to the organic phase. This flushing effect, which dewaters the presscake, takes place very rapidly, the amount of water separated off by decanting being 635 ml (=87%). The now viscous mass is adjusted with a further 80 parts of the above flushing varnish to a just kneadable consistency and finally the remaining water is evaporated off at room temperature by applying a vacuum.

Following the treatment under reduced pressure for approximately 3 hours, the prepared paste is substantially dry; its residual moisture content is less than 0.5%. After a further 80 parts of flushing varnish have been added and kneaded in the result is a strong, fluent paste. The pigment content of the ready-prepared preparation is 43% and the viscosity is 74 Pa·s; the preparation is consequently readily pumpable. There is no sign of thixotropy even after 8 days. The paste thus produced has a tack, measured using the "Inkomat" from Prüfbau, of 20.5–21 incometer units and consequently is very highly suitable in the printing ink sector for use in letterpress and offset printing processes. During storage at 60° C. for 5 days the viscosity of the pigment preparation increases only insignificantly.

The pigment preparation obtained in this way can be mixed with other printing inks in a dissolver or in a three-roll mill. For example, mixing 1 part of the pigment preparation of the present invention with 4 parts of a black paste comprising 20% of carbon black, 75% of varnish and 5% of a wax paste (30% of polyethylene wax in mineral oil) in the presence of 1% of a varnish drier produces a printing ink which on printing exhibits a good gloss and brightening effect.

EXAMPLE 2 (comparative sample)

A kneader of the kind mentioned in Example 1 is charged with 240 parts of a pigment of the same type, again as an aqueous presscake of the same composition, and without prior exposure to the flushing aid the pigment presscake is in this case flushed at once by portionwise addition of the same flushing varnish as in Example 1. It takes about 45 minutes and the addition of 220 parts of the flushing varnish until any water is eliminated. The amount of water separated off in this case is 425 ml (=62%).

The subsequent drying of the kneader batch to a residual moisture content of <0.5% under reduced pressure took about 8 hours. Toward the end of this drying period it was necessary to add a further 60 parts of flushing varnish to the kneader batch, since the mass had become too viscous and proper kneading was no longer possible. A further 20 parts of varnish were added at the end to adjust the paste to a pigment content of 43% as in Example 1.

The paste thus prepared is obtained in a very highly viscous state (210 Pa·s) with marked signs of thixotropy, and these properties become even more pronounced on storage at 60° C. for 5 days. Despite the high viscosity the tack of the preparation is comparatively low at 12.2–13.2 incometer units.

EXAMPLE 3

The preparation is prepared as described in Example 1, except that the moist pigment presscake is kneaded in the kneader with 14 parts of the same flushing aid and the batch is then flushed as described and dried under reduced pressure. The dry kneaded mass is then admixed with a further 130 parts of flushing varnish to produce a paste having a pigment content of 39.3%. Despite the relatively high pigment content this paste has a viscosity of <3 Pa·s, which hardly changes even on storage at 60° C. for 14 days.

Surprisingly, the rheological properties of a black ink obtained as in Example 1 using the paste thus obtained are not adversely affected. The result is a printing ink which is fully satisfactory in tack and printability.

EXAMPLE 4

240 parts of the colorant C.I. Pigment Blue 56 (No. 42800) of the formula VIII

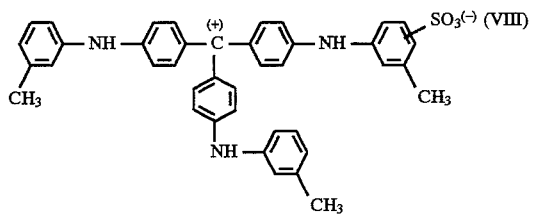

in the form of an aqueous presscake (896 parts) having a pigment content of 26.8% are admixed in a kneader equipped with sigmoidal paddles with 11.2 parts of the flushing aid specified in Example 1 and intimately mixed therewith. The subsequent flushing treatment is effected as described in Example 1, except that the binder combination is added a little at a time, a total of 530 ml (=81%) of the water entrained in the presscake being separated off in the course of 3 flushing operations and a total consumption of 250 parts of the flushing varnish of the type specified in Example 1. The remaining water is evaporated off following the prior addition of a further 20 parts of the flushing varnish by applying a vacuum for about 4 hours, and finally the kneaded paste is adjusted with a further 20 parts of varnish and 30 parts of a low-aromatics mineral oil of boiling range 260°–290° C. to a pigment content of 43%.

The resulting paste has a viscosity of 32 Pa·s, is excellently pumpable and shows no sign of thixotropy even after 8 days' storage at 50° C. The grindometer value as a measure of pigment dispersion is distinctly better at 20 μ than that of a comparative paste prepared in the same way but without the flushing aid.

The pigment preparation obtained is mixed with a black paste in a weight ratio of 1:9 to give a printing ink which produces prints of high gloss and a greenish brightening effect.

EXAMPLE 5

240 parts of a pigment conforming to the structure of Example 1 in the form of an aqueous presscake are carefully mixed in the manner of Example 1 with 11.2 parts of the flushing aid described in Example 1. A blown linseed oil varnish is then added a little at a time to effect flushing of the crude pigment. The amount of water eliminated in the course of this flushing treatment is 590 ml (=81%). The kneader paste obtained is worked up as described in Example 1.

The dried product has a pigment content of 42% and a viscosity of 12 Pa·s. The coarse content of the paste, as indicated by the grindometer value, is distinctly better than that of similar pastes prepared without the flushing aid.

EXAMPLE 6

The flushing aid used to prepare the preparation described hereinafter is the condensation product—described in the above Example 1—of a hydroxystearic polyester with dimethylaminopropylamine prepared as described in Example 1 of DE Patent 2,264,176 (U.S. Pat. No. 3,996,059), mixed in a weight ratio of 4:1 with a dyestuff-containing adduct which is obtainable by the method of Example 5 of DE Patent 2,206,611 (U.S. Pat. No. 4,013,687) by reacting copper tris(chloromethyl)phthalocyanine with a polyester B (degree of condensation y=3.3) prepared from a mixture of stearic acid and 12-hydroxystearic acid.

14 g of this (4:1) mixture of the two above-identified types of flushing aid are first mixed by the procedure of Example 1 into the aqueous presscake of the sulfonated triphenylpararosaniline compound of the formula VII. In the subsequent flushing by the method described in Example 1 and with the same composition of the binder combination used it is again possible to save about 20% of the flushing varnish quantity required for pasting, compared with batches without a flushing aid of the present invention but with otherwise the same flushing treatment. In the present case, the amount of water separated off from the presscake by the measures mentioned is 89%. After the preparation has been dried under reduced pressure and set to a 46% pigment content by means of varnish and mineral oil the result is a fluent paste having a viscosity of 28 Pa·s.

In the course of 5 days' storage of the preparation at 60° C. the viscosity thereof increases only insignificantly. The grindometer value at about 20 μ is significantly better than that of a paste without flushing aid.

What is claimed is:

1. A pasty pigment preparation consisting essentially of
  a) from 5% to 50% by weight of at least one pigment of the formula I

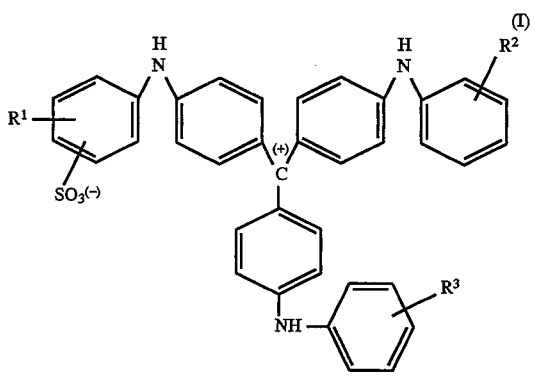

where $R^1$, $R^2$ and $R^3$ are each independently of the others hydrogen, halogen, $C_1$–$C_3$-alkyl, $C_1$–$C_3$-alkoxy or nitro;

b) at least one long-oil alkyd resin which is derived essentially from a polyester and has an oil content of from 70% to 80% by weight, said oil content being due to the modification of the polyester with a drying, semidrying or nondrying oil, a mixture of a plurality of these oils or with corresponding fatty acids or a combination thereof, the dicarboxylic acid component of the polyester being based on a mixture of isophthalic and orthophthalic acid and a small proportion of at least one α,β-unsaturated dicarboxylic acid or anhydride of the underlying dicarboxylic acid and the polyhydric alcohol component of the polyester comprising a mixture containing glycerol and pentaerythritol;

c) at least one hydrocarbon resin having an average molecular weight in the range from 600 to 1700, or at least one natural resin ester derived essentially from modified or unmodified natural resin acids and monohydric or polyhydric alcohols of from 1 to 20 carbon atoms, the weight ratio of component b) to component c) varying within the range from 1:3 to 3:1;

d) at least one flushing aid based on a condensation product of an aliphatic amine or a corresponding quaternary ammonium compound with a polyester derived from essentially a monobasic aliphatic hydroxycarboxylic acid; and
  e) a high-boiling mineral oil.

2. The pigment preparation of claim 1, containing
  a) from 20 to 48% by weight of pigment of the formula I;
  b) and c) from 20 to 50% by weight of a mixture of the resins defined therein as constituents of these components;
  d) from 0.3 to 10% by weight of the flushing aid; and
  e) from 20 to 50% by weight of high-boiling mineral oil.

3. The pigment preparation of claim 1, in which component d) comprises a condensation product of the formula II

where Y is the radical of a polyester chain which together with the adjoining —CO— group is derived from essentially a hydroxycarboxylic acid of the formula III

where X is the divalent radical of a saturated or unsaturated, aliphatic chain hydrocarbon having at least 8 carbon atoms, in which there are at least 4 carbon atoms between the hydroxyl and the carboxylic acid group, or from essentially a mixture of such a hydroxycarboxylic acid of the formula III and a hydroxyl-devoid aliphatic carboxylic acid, Z is a divalent aliphatic bridge member which is bonded to the —CO— group via an oxygen or nitrogen atom, and Q is either an amino group or a salt thereof with an acid, or a quaternary ammonium salt grouping.

4. The pigment preparation of claim 3, in which component d) additionally comprises a dyestuff-containing polyester adduct of the formula

(Y—CO—O—Z')$_n$D     (V)

where D is the radical of an organic dyestuff which is bonded to each Z' via a carbon atom of an aromatic ring present in D, Y is as defined for the formula II, n is an integer from 1 to 8 inclusive and Z' is a divalent aliphatic bridge member.

5. The pigment preparation of claim 1, having a tack within the range from 4 to 25 incometer units, suitable for use in printing inks for letterpress and offset printing.

6. A process for preparing a pigment preparation as defined in claim 1, which consists essentially of the components a) to e) mentioned therein by flushing aqueous presscakes of at least one pigment of formula I, which comprises prior to the start of the actual flushing treatment first of all thoroughly mixing the water-moist pigment presscake with the aid of component d) and only then initiating the actual flushing process either by adding, as a binder, a portion of the solution of a resin mixture of components b) and c) in component e) or by adding an oxidatively drying varnish based on olefinically unsaturated compounds, derived from vegetable or animal oils and transferring the pigment into the remaining binder, the water which is liberated from the presscake in the course of flushing being removed and the residual water then still remaining in the pigment paste thus obtained being evaporated off by drying under reduced pressure.

7. A method for coloring a printing ink comprising the step of introducing the pasty pigment preparation as obtained by the process of claim 6 into an ink composition as a colorant for said composition.

8. A pigment preparation obtained by the process of claim 6.

9. The process of claim 6, wherein before or during the removal of the remaining water by treatment under reduced pressure the flushed paste formed has added to it further mineral oil of component e) either alone or together with a solution of the resin mixture of components b) and c) in mineral oil of component e).

10. A pigment preparation obtained by the process of claim 9.

11. A method for coloring a printing ink comprising the step of introducing the pasty pigment of claim 1 into an ink composition as a colorant for said composition.

12. A printing ink as produced in claim 11, which has a viscosity within the range from 20 to 60 Pa·s.

13. A printing ink as produced in claim 11, which has a viscosity within the range from 25 to 40 Pa·s.

14. A method for coloring an offset printing ink composition comprising the step of introducing the pasty pigment of claim 1 into an ink composition as a colorant for said composition.

15. A printing ink as produced in claim 11, which has a viscosity within the range from 28 to 32 Pa·s.

16. The printing ink as claimed in claim 15, wherein the pigment of formula I is of the formula VIII

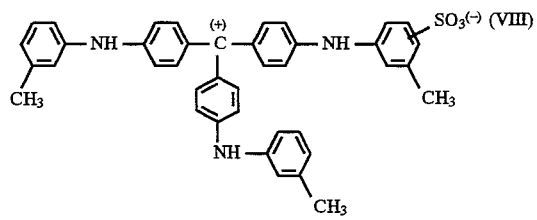

and said printing ink has a viscosity of 32 Pa·s.

17. A pasty pigment preparation consisting essentially of a) from 5% to 50% by weight of at least one pigment of the formula I

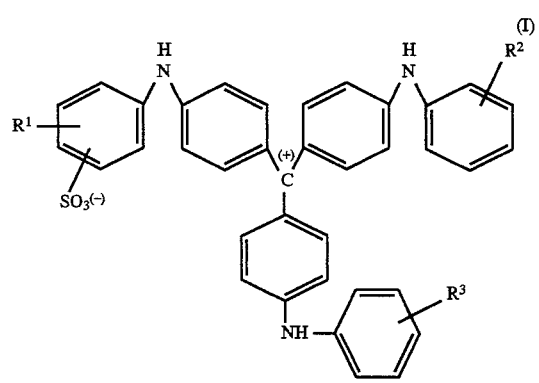

where $R^1$, $R^2$ and $R^3$ are each independently of the others hydrogen, halogen, $C_1$–$C_3$-alkyl, $C_1$–$C_3$-alkoxy or nitro;

d) at least one flushing aid based on a condensation product of an aliphatic amine or a corresponding quaternary ammonium compound with a polyester derived from essentially a monobasic aliphatic hydroxycarboxylic acid; and f) at least one oxidatively drying varnish based on olefinically unsaturated compounds, derived from vegetable or animal oils.

18. The pigment preparation of claim 17, containing f) from 40 to 80% by weight of oxidatively drying varnish.

* * * * *